(12) United States Patent
Marum et al.

(10) Patent No.: US 8,843,843 B2
(45) Date of Patent: Sep. 23, 2014

(54) METHOD AND SYSTEM USING HEURISTICS IN PERFORMING BATCH UPDATES OF RECORDS

(75) Inventors: Matthew Gordon Marum, Cary, NC (US); Samuel George Padgett, Raleigh, NC (US); Nirav S. Sheth, Cary, NC (US); Steven Keith Speicher, Holly Springs, NC (US); Michael J. Tabb, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 12/823,785

(22) Filed: Jun. 25, 2010

(65) Prior Publication Data

US 2011/0320972 A1 Dec. 29, 2011

(51) Int. Cl.
*G06F 17/30* (2006.01)
*G06F 3/048* (2013.01)

(52) U.S. Cl.
CPC .................. *G06F 17/30377* (2013.01)
USPC .......... 715/771; 715/229; 707/E17.005; 707/609; 707/610; 707/812; 707/825

(58) Field of Classification Search
CPC .............. G06F 17/30321; G06F 17/30575
USPC ................................... 715/771, 229
See application file for complete search history.

(56) References Cited

U.S. PATENT DOCUMENTS

| | | | |
|---|---|---|---|
| 5,903,905 A * | 5/1999 | Andersen et al. | 715/275 |
| 6,148,308 A * | 11/2000 | Neubauer et al. | 707/695 |
| 6,480,847 B1 * | 11/2002 | Linenbach et al. | 707/600 |
| 6,560,501 B1 * | 5/2003 | Walser et al. | 700/99 |
| 6,686,917 B2 * | 2/2004 | Tarr | 345/441 |
| 6,836,689 B2 * | 12/2004 | Walser et al. | 700/100 |
| 7,010,364 B1 * | 3/2006 | Singh et al. | 700/51 |
| 7,130,783 B1 * | 10/2006 | Harer et al. | 703/13 |
| 7,257,689 B1 * | 8/2007 | Baird | 711/162 |
| 7,730,450 B2 * | 6/2010 | Mercer | 717/120 |
| 2004/0172409 A1 * | 9/2004 | James | 707/104.1 |
| 2004/0230580 A1 * | 11/2004 | Li et al. | 707/10 |

(Continued)

OTHER PUBLICATIONS

Interaction Design, Heuristics and heuristic evaluation, Jul. 27, 2007, pp. 1-2 http://web.archive.org/web/20070727205908/http://www.interaction-design.org/encyclopedia/heuristics_and_heuristic_evaluation.html.*

(Continued)

*Primary Examiner* — Stephen Hong
*Assistant Examiner* — Mario M Velez-Lopez
(74) *Attorney, Agent, or Firm* — Holland & Knight LLP; Brian J. Colandreo, Esq.; Jeffrey T. Placker, Esq.

(57) ABSTRACT

Computer method and apparatus processing batch changes to a plurality of records employs heuristics. The system includes a computer based source of a plurality of records subject to a batch update. Each record in the plurality has respective meta data information. A computer processor projects application of changes forming the batch update in one record of the plurality. The processor applies heuristics including noting metadata information of the one record impacting changes to each record in the plurality. Using the noted metadata information and heuristics, the system further projects application of the batch update changes to remaining records in the plurality. A preview display of the projected results of the batch changes allows the user to commit, modify or revert batch updates per record.

10 Claims, 5 Drawing Sheets

(56) References Cited

U.S. PATENT DOCUMENTS

| | | | |
|---|---|---|---|
| 2005/0137899 A1* | 6/2005 | Davies et al. | 705/1 |
| 2007/0226196 A1* | 9/2007 | Adya et al. | 707/3 |
| 2008/0195651 A1* | 8/2008 | Rachmiel et al. | 707/102 |
| 2008/0288632 A1* | 11/2008 | Cantor et al. | 709/224 |
| 2009/0043762 A1* | 2/2009 | Shiverick et al. | 707/5 |
| 2009/0157772 A1* | 6/2009 | Picon et al. | 707/203 |
| 2010/0145917 A1* | 6/2010 | Bone et al. | 707/694 |
| 2011/0010669 A1* | 1/2011 | Basu et al. | 715/825 |
| 2011/0161371 A1* | 6/2011 | Thomson et al. | 707/792 |

OTHER PUBLICATIONS

Stackoverflow Why are batch inserts/ updates faster? How do batch updates work?, Jul. 22, 2009, pp. 1-5 http://stackoverflow.com/questions/1006969/why-are-batch-inserts-updates-faster-how-do-batch-updates-work.*

International Search Report and Written Opinion of PCT/EP2011/059168 dated Dec. 6, 2011.

Dam, K.H., "An agent-oriented approach to support change propagation in software evolution", Proc. of $7^{th}$ Int. Conf. on Autonomous Agents and Multiagent Systems (AAMAS 2008). Padgham, Parkes, Müller and Parsons (eds.). May 12-16, 2008. Estoril, Portugal. pp. 1736-1737.

Al-Rababah, A.A, et al., "Notice of Violation of IEEE Publication Principles Heuristic Change Propagation Model Encompassing Ripple Effect (HRE)", Modern Problems of Radio Engineering Telecommunications, and Computer Science, *IEEE*, pp. 28-30, Feb. 28, 2006.

Tratt, L. "A Change Propagating Model Transformation Language", *Journal of Object Technology*, vol. 7, No. 3, Mar.-Apr. 2008, pp. 107-126.

* cited by examiner

100

○ Batch Update

Make adjustments to the pending changes below

Changes to be performed ———— 13a
- ☑ ⚐ Change State to "Closed"
  - ☑ O SAMPL0000001
  - ☑ O SAMPL0000002
- ☑ ⚐ Multiline Text Changes ———— 13b
  - ☑ O SAMPL0000001 ——— 15a
    - ☑ O Description
      - ☑ ⚐ Insert New Text "Text added as part of Batch Op...
      - ☑ ⚐ Append New Text "Text added to bottom of Descriptio...
  - ☑ O SAMPL0000002 ——— 15b
- ☑ ⚐ Add Attachment "C:\test.log" ——— 13c
  - ☑ O SAMPL0000001
  - ☑ O SAMPL0000002

☐ SAMPL00000001 : Description

| Original Source | Refactored Source |
|---|---|
| Some of the Original Text.<br>Some more Original Text<br><br>17 | Some of the Original Text.<br>New Text added as part of Batch O<br>Some of the Original Text |

< Back

FIG. 1

METHOD AND SYSTEM USING HEURISTICS IN PERFORMING BATCH UPDATES OF RECORDS

BACKGROUND

Batch updating is a problem when a user needs to make the same or similar changes on multiple change requests (or bug records) by editing a single change request and then applying those changes to all requests in the batch. The problem is figuring out how the changes from the first change request should be applied to all subsequent requests the way the user intended. This is a problem often encountered in change request (bug tracking) systems where many change requests may need to be updated at once, for example as part of iteration planning.

Mistakes in batch update can be extremely costly in terms of time and lost data. It is not uncommon for hundreds of change requests to be misplaced or to be updated incorrectly. Batch update is often used when performing a triage on a backlog of requests, or moving several requests into the new iteration. Mistakes can cause these requests to get misplaced, lost, or overwritten. Requests often contain valuable information like customer data, detailed descriptions, logs, etc. Usually users and administrators are left going through change requests one by one, or restoring a database backup, when batch update is supposed to be a time saver.

A common solution is to simply copy the field values or the deltas from the first change request into subsequent requests, but this does not always match the user's intent. Data is lost and productivity is lost by having to go back and fix forms that were incorrectly changed.

BRIEF SUMMARY

The present invention addresses the foregoing problems and shortcomings of the art. In particular, the present invention employs heuristics in batch updating of a plurality of database records, e.g., change requests.

According to one embodiment of the present invention heuristics are based upon form field type and context. The heuristics are used to figure out the appropriate operation to perform on subsequent change requests. Operations include replace, append, prepend, increment, etc.

The field operations can also be configurable such that operations can be changed or added. These operations can also be scriptable where a user or administrator prepares a special operation for specific fields. For example, a script may be written to bring changes into a listing such that the final list maintains alphabetical order. In another example, if examining a reference from one change request to another change request, the default heuristic may overwrite the value. In another example, if dealing with a list of references to other change requests, some heuristics may add or subtract these references. Or if examining a notes or discussion field, a heuristic may be to add new comments only to relevant discussions or to at least make sure when new comments are added that the notes remain properly formatted.

These operations are applied consistently across all requests in the batch, or determined for each change request in the batch individually. Additionally, a batch update preview is created and enables a user to quickly see what will change and to then adjust, commit, or back out their batch update. The advantages of this system are that the changes that are being made are smarter and more like those intended and wanted by the user. The user also has an opportunity to prevent mistakes and errors before they actually happen.

In one embodiment a computer method or system processing batch changes to a plurality of records, comprises:

a digital processor obtaining a plurality of records subject to a batch update, each record in the plurality having respective metadata information;

a computer configured to project application of changes forming the batch update in a first (i.e., any one) record of the plurality, said projecting including noting metadata information of the first (one) record impacting changes to each record in the plurality; and using the noted metadata information, the computer projecting application of the batch update to remaining records in the plurality.

In accordance with one aspect of the present invention, the batch update may be formed of one or more operations. The plurality of records may be a collection of change requests. In other embodiments, the plurality of records is a plurality of data base records.

In one embodiment, the method or system further comprises, for each record, displaying a preview of the projected application of the batch update changes. The previewer or preview displayer further enables user interaction with records and projected application of the batch update changes as displayed in the preview. The user interaction may include any one or more of:

de-selection of the projected application of one or more or the batch update changes, the de-selection and adjustment may be on a per record basis or an all records basis;

adjustment of the projected application of one or more of the batch update changes; and rewriting of one or more of the batch update changes in line of a certain record.

The system and method further comprise committing one or more of the batch update changes in accordance with user command. Similarly, the system and method may comprise reverting one or more of the batch update changes in accordance with user command.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 is a schematic illustration of a preview screen in one embodiment.

DETAILED DESCRIPTION

Batch processing affects a collection of items, such as a plurality of database records. Generally a "batch update" applies a change or set of changes (such as add, delete, move or modify) similarly to each item in the collection. For non-limiting example, a database of change request records is discussed below although the present invention may apply to any domain that has a concept of updating more than one record or member of a collection (plurality) at a time.

Figure 2:
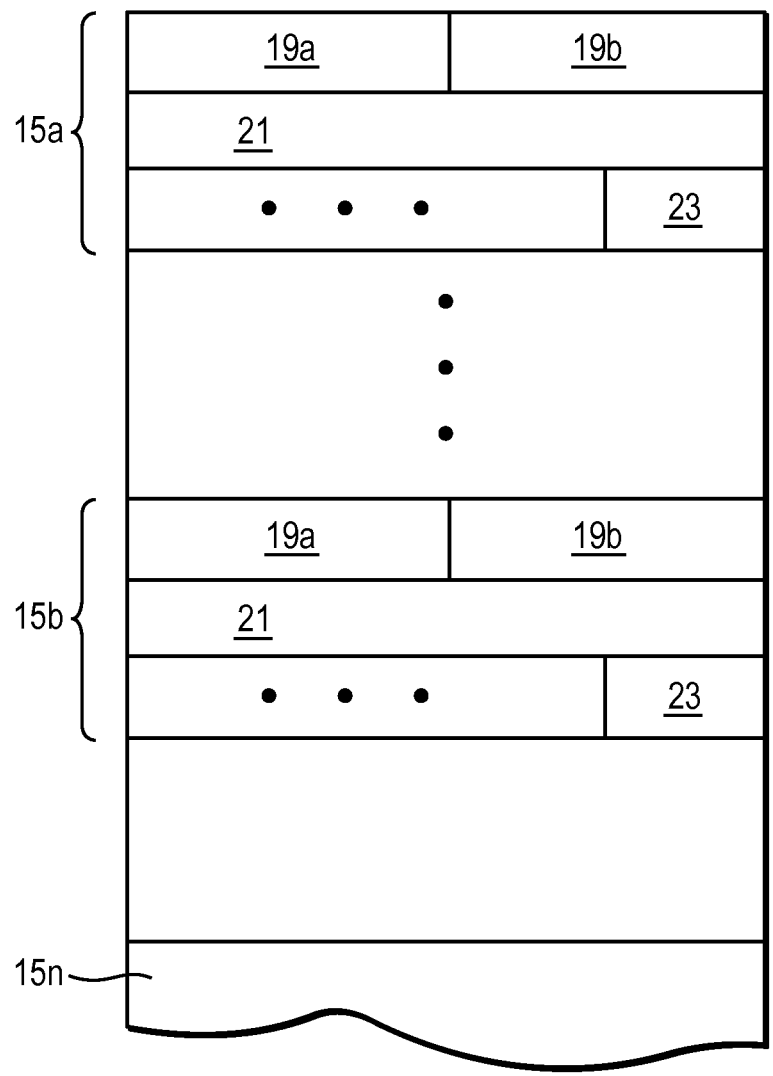
FIG. 2 is a schematic view of database records (e.g., change requests) in the embodiment of FIG. 3.

A non-limiting example database 94 of records (e.g., change requests) 15 is illustrated in FIG. 2. Each change request is represented in database 94 by a respective record 15. For each record 15, there are a number of fields 19, 21, 23. Each field 19, 21, 23 holds a respective value indicative of the change request 15. In addition to field value, there are metadata per field that further defines or specifies attributes of the respective record and change request 15. The metadata may include field data type (e.g., Boolean, character string/text, numeric, list, reference, etc.), field length (e.g., 1 bit, multi-bit, etc.) and data format (e.g., alphanumeric, n-point precision, bit switch, linked list, pointer, etc.).

Given a database 94 (FIGS. 2 and 3) of change requests/records 15a, 15b, a user identifies certain ones to be treated in batch. That is, the plurality of identified records (change requests 15 in FIG. 1) forms a batch. The user defines or otherwise specifies the set of changes (batch operations) 13 for this plurality, i.e., the batch update.

After the user has selected a batch of change requests 15 and has specified the desired changes (batch operations) 13, the invention system 100 uses the desired changes (operations) 13 and the existing data in the request records 15 as inputs into preconfigured or user defined heuristics.

According to one embodiment of the present invention, the heuristics are based upon field type and context, and help determine the appropriate operation to perform on subsequent change requests 15. Operations include replace, append, prepend, increment, etc. The field operations are configurable so that operations can be changed or added. These operations can also be scriptable where a user or administrator prepares a special operation for specific fields 19, 21, 23.

A non-limiting illustrative example set of heuristics is as follows. If the record field 19, 21, 23 is a list holding data in alphabetical order, then after application of the changes (batch operations) 13, make necessary changes to the final list to maintain alphabetical order. If examining a reference from one change request (record) 15 to another change request (record) 15, the default heuristic may overwrite the value. If dealing with a list of references to other change requests (records) 15, then some heuristics may add or subtract these references. Or if examining a notes or discussion field 19, 21, 23, then a heuristic may add new comments only to relevant discussions or to at least make sure when new comments are added that the notes remain properly formatted.

These operations (including heuristics) are applied consistently across all change requests/records 15 in the batch, or determined for each change request 15 in the batch individually. The system 100 attempts to best match the changes (batch operations) 13 the user specifies to make against the data that already exists in the record 15. After this time, the user is allowed an opportunity to manually intervene.

System 100 allows the user to directly adjust the final output values or to change the heuristics that are applied to be more in line with his intent. At each step, the system 100 displays to the user a preview 17 (FIG. 1) of the final outcome of the batch operation 13 and heuristic changes/refinements. But the user is still able to back out (not commit the change/batch operation 13) at any time. Once the user chooses to complete the batch update operation 13, the changes (including user selected heuristic changes/refinements) are then committed to the database 94.

With reference now to FIG. 1, one embodiment of the present invention is shown for purposes of illustration and not limitation. Shown at 13b is one of the batch updates, the "multiple text changes" operation, desired and specified by the user. The other listed batch updates 13a, c in FIG. 1 are the "Change State to Closed" operation and the "Add Attachment c:\test.log" operation. The change request records 15 to be affected by each listed batch update/operation 13 are indicated in outline or hierarchical tree fashion underneath the operation name. For example, change requests "SAMPL 0000001" 15a and "SAMPL 0000002" 15b are indicated as respective nodes (leaves) under each listed batch update (operation) 13 entry or branch.

In the illustrated example, the user has selected change request record 15a "SAMPL 0000001" listed to be changed by "Multiple Text Changes" batch update 13b. In particular, the Description field of that record 15a is being modified with insertion or new text and with new text appended. In response to user selection of the text insertion change, the system 100 displays a preview at 17 in FIG. 1. In the preview 17, the system 100 displays the original field value/contents from the source record 15 (i.e., original text of the Description field) and in a pane or window next to that displays the result of the proposed text insertion change (subject batch operation) 13b. The example results illustrate the new text inserted between original lines of text of the Description field.

Known or common preview display techniques are used.

In another example, the user selects several change requests/records 15 that are not assigned to any iteration, but need to be assigned to the next iteration. In the first request/record 15a, the user adjusts the iteration value and then chooses batch updates/operations 13 that add a keyword to a keywords field 19a, and remove the last customer name from a customers field 21 associated with the change request 15a.

The system 100 determines that the iteration value was changed, so then chooses to change the iteration value for all subsequent records 15b, . . . , n. The system 100 knows from field definitions metadata that the keywords field 19a is a list, and determines that since a new keyword was added to this list it should add this keyword to the keywords field (list) 19a of subsequent change requests/records 15 if it does not already exist. The system 100 then determines from record metadata that the customers field 21 is a list and has had a customer name removed, and so choose to remove that customer name from respective customers fields 21 in subsequent change request records 15. Perhaps the current iteration has a process rule that requires all change requests/records 15 to have a reviewer. A custom operation could be predefined and applied to the "Reviewer" field 23 such that an appropriate reviewer is selected for each change request 15 rather than reusing the reviewer name from the first request record 15a.

The system's 100 heuristics compute field dependencies and attempts to resolve them. But the system 100 also provides to the user an opportunity to review the suggested refined changes and satisfactorily resolve any errors prior to committing the batch update 13. For example, change request records 15 for the new iteration may require the work estimate field 19b to be filled in, but some of the records being changed may not have that field filled in. In response, the system 100 projects an iteration value, but then presents a preview dialog 17 to allow the user to see the projected value and accept it or change it.

This preview dialog 17 allows a user to get a view of the changes, with annotations about how those changes were made or determined, and supports allowing the user to make further adjustments to those changes as necessary. This can be similar to Eclipse's refactoring preview dialog where the user can adjust what file changes he wants to actually have happen, and are provided an opportunity to back out before the changes are actually written (electronically effected and stored). This preview dialog 17 may display all the change requests (records) 15 being changed and the individual field 19, 21, 23 changes in a hierarchical format. In one embodiment, the user deselects changes (batch operations) 13 he does not want to make, adjusts how the changes 13 are applied, or rewrites them inline for individual requests (records) 15 or all change requests (records) 15. For example, instead of incrementing an integer value, this dialog 17 allows the user to overwrite the integer value for all change requests 15 with the value from the first change request 15a or to always remove the Nth customer from the customer field 21 rather than matching on a customer's name.

Once satisfied, the user using the preview dialog 17 may instantly revert or commit the batch update changes 13 with a touch of a button (or similar user command). Common techniques in the art are employed to accomplish this.

Figure 4:
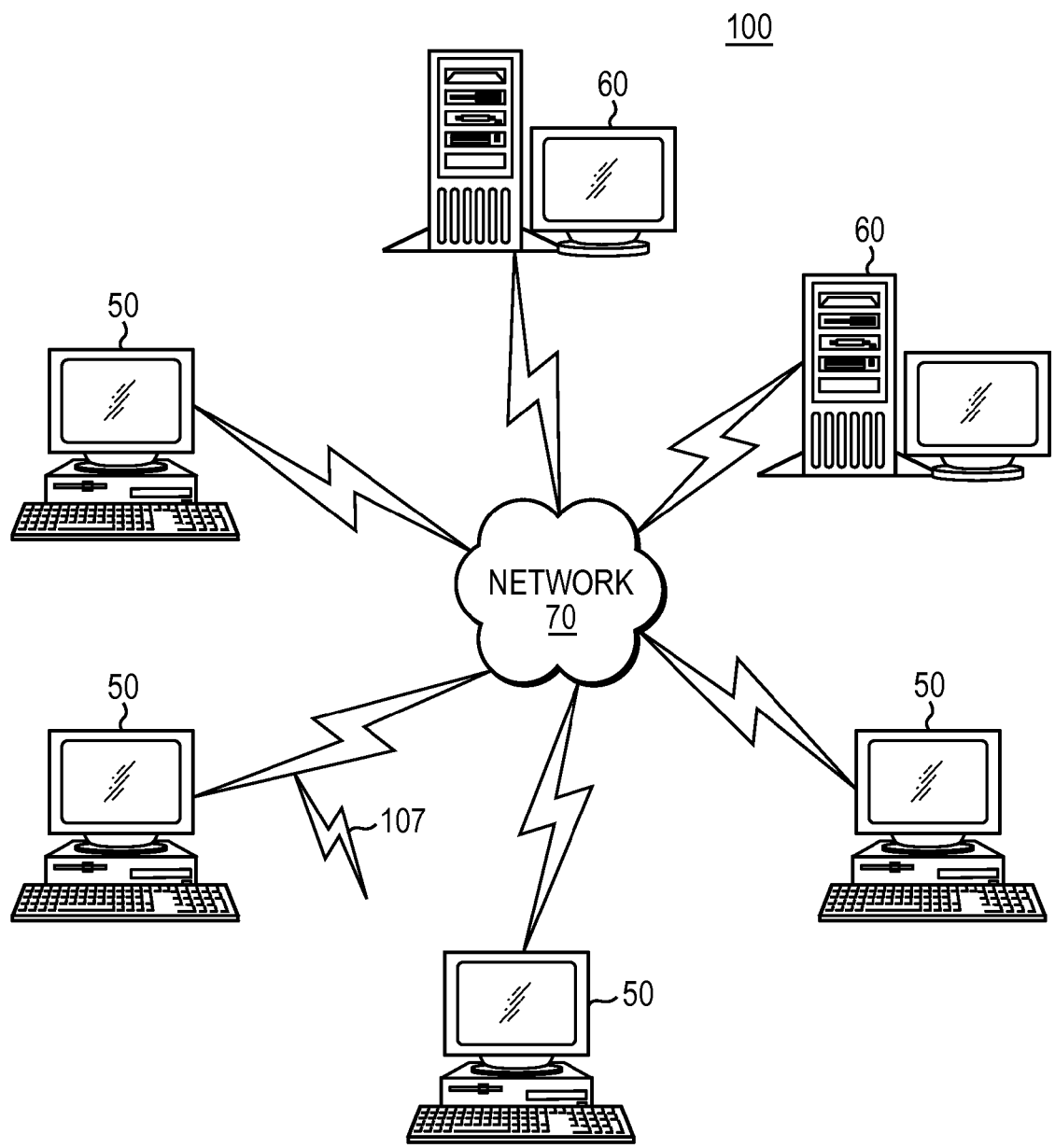
FIG. 4 is a network of computers of the FIG. 3 embodiment.

FIG. 4 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 3:
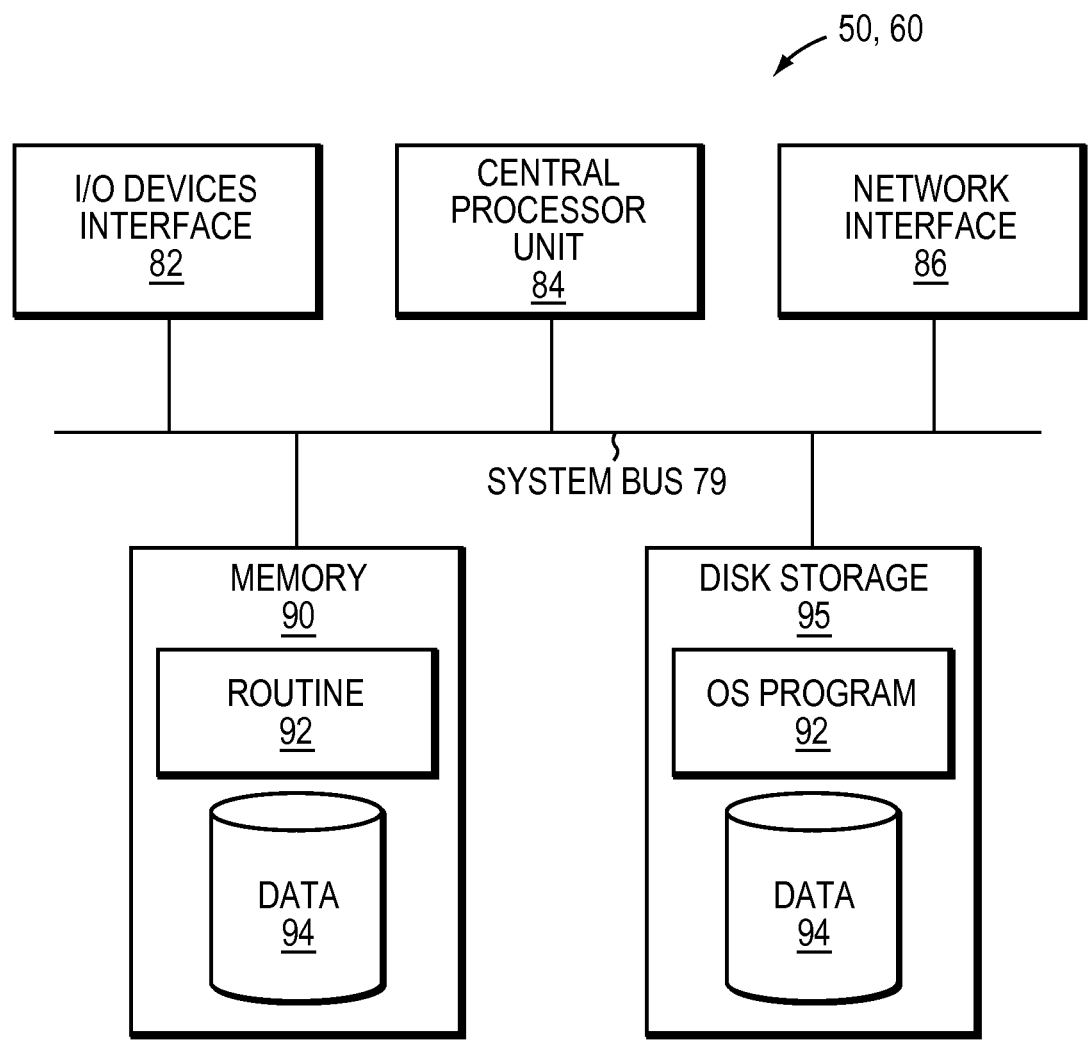
FIG. 3 is a block diagram of a computer device implementing one embodiment of the present invention.

FIG. 3 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., batch update system 100 using heuristics, preview displayer 17 and supporting code detailed above and below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
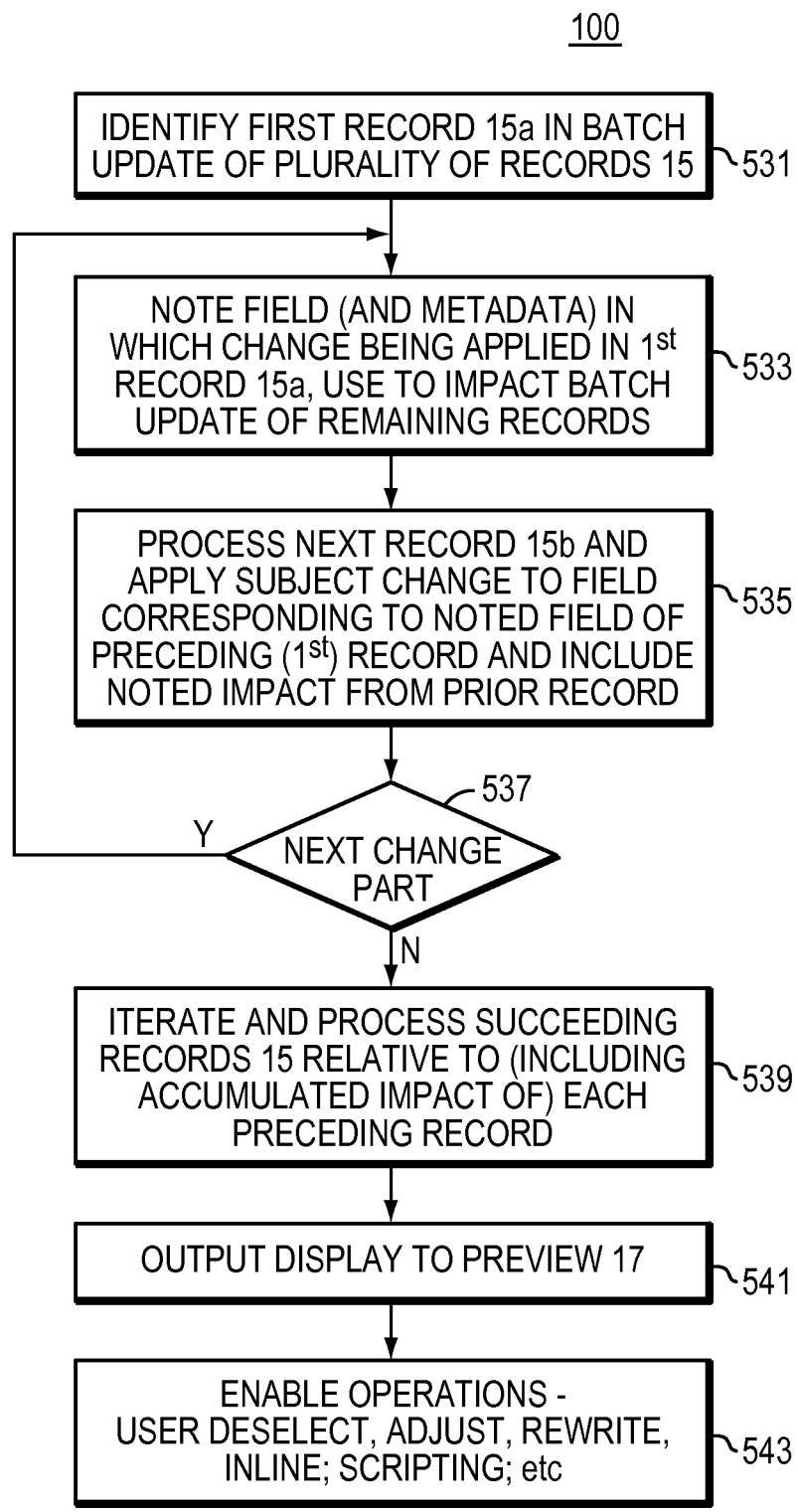
FIG. 5 is a flow diagram of one embodiment of the present invention.

Referring now to FIG. 5, a flow diagram of one embodiment 100 of the present invention is presented. System/process 100 begins with step 531 identifying a first record 15a of a plurality of records subject to batch updates/changes 13. In response to the subject change (batch operation) 13, step 533 determines the field 19, 21, 23 affected by the change. Using the record metadata for this field 19, 21, 23, step 533 notes pertinent factors such as data type and context, for non-limiting example and refines the change as applied in an uncommitted state. Step 533 executes applicable heuristics (as described above) which may be implemented on a rules-basis or using other programming techniques in the art. Step 533 notes metadata particulars and context for each change (batch operation) 13 being applied to the record 15a.

Process passes to the next record 15b in the plurality (batch) and step 535 considers any noted factors generated by step 533 in processing the preceding record 15a. In particular, for the subject change/batch operation 13, step 535 processes the respective field 19, 21, 23 in current record 15b that corresponds to the noted and about to be changed field(s) of the preceding record 15a using noted and learned factors (including context) to this point. Step 535 similarly executes and applies heuristics.

A given batch operation 13 may have multiple steps/parts. For each part of a batch operation 13, steps 533 and 535 are repeated by loop (iteration decision) 537.

After processing the first two records 15a, 15b in the plurality, the next record and succeeding records are iteratively processed at step 539. Each succeeding record 15 is processed with respect to considerations and factors learned (noted) in the processing of the preceding records. System 100 executes and applies heuristics accordingly.

The foregoing processing is displayed in preview 17 (FIG. 1). Step 541 generates and supports preview display 17, including in response to user interaction calling functions or operations 543. For non-limiting example, operations 543 enable user de-selection of a displayed change-to-be, user adjustment of a displayed change-to-be, user rewriting of a change inline, user script generation, and the like as discussed above. Known techniques for implementing operations 543 are utilized. At the end of process 100, by user-command, the system may commit some or all changes/batch updates 13 and/or revert some or all batch updates/changes 13 using known techniques.

Accordingly, system 100 provides for the use of heuristics in performing batch updates 13 of change requests (a plurality of database records) 15. The advantages of system 100 are that the batch changes that are being made are smarter and more like those intended and wanted by the user. The user also has an opportunity to prevent mistakes and errors before they occur.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While this invention has been particularly shown and described with references to example embodiments thereof, it will be understood by those skilled in the art that various changes in form and details may be made therein without departing from the scope of the invention encompassed by the appended claims. For example, records and fields of a record my have metadata defined by class or type of record. Then the class or type effectively provides a template of the metadata that may be utilized by embodiments of the present invention. Based on the template of metadata, pertinent changes (batch updates) can be projected according to the principles of the invention.

What is claimed is:

1. Computer apparatus processing batch changes to a plurality of records, comprising:
    a computer based source of a plurality of records subject to a batch update, each record in the plurality of records having respective meta data information, and the batch update being formed of a set of changes for the plurality of records, wherein the batch update applies the set of changes similarly to each record in the plurality of records;
    a computer processor configured to project application of the changes of the batch update in a first record of the plurality of records, the processor noting factors from the metadata information of the first record and determining affects of the changes as applied to the first record, and using the noted factors and determined affects from the first record to impact changes to each remaining record in the plurality of records, the processor further projecting application of the batch update changes to remaining records in the plurality of records in a manner employing user-defined heuristics such that each succeeding record is processed with respect to factors noted in processing of preceding records, wherein the user-defined heuristics are based upon context, and help determine appropriate operation to perform on subsequent records, the determined operation being (i) applied consistently across the subsequent records, or (ii) determined for each subsequent record individually by user scriptable operations for specific parts of the record; and
    a preview display displaying a preview of the projected application of the batch update changes to the remaining records in the plurality of records with annotations including how the projected application of the batch update changes to the remaining records in the plurality of records were determined, wherein the preview display allows for de-selection of the projected application of one or more of the batch update changes on a per record basis or an all records basis.

2. Computer apparatus as claimed in claim 1, wherein the set of changes of the batch update is formed of one or more operations.

3. Computer apparatus as claimed in claim 1, wherein the plurality of records is a collection of change requests.

4. Computer apparatus as claimed in claim 1, wherein the plurality of records is a plurality of data base records.

5. Computer apparatus as claimed in claim 1, further comprising:
    a user interface enabling user interaction with records and projected application of the batch update changes as displayed in the preview;
    the user interaction including any one or more of:
        adjustment of the projected application of one or more of the batch update changes; and
        rewriting of one or more of the batch update changes in line of a certain record.

6. Computer apparatus as claimed in claim 5, where the adjustment is on a per record basis or an all records basis.

7. Computer apparatus as claimed in claim 5 wherein the user interaction further includes initiating committing one or more of the batch update changes.

8. Computer apparatus as claimed in claim 5 wherein the user interaction further includes initiating reverting one or more of the batch update changes.

9. A computer program product for using heuristics in performing batch updates to a plurality of records, the computer program product comprising:
    a non-transitory computer readable storage medium having computer readable program code embodied therewith, the computer readable program code comprising:
        computer readable code configured to obtain a plurality of records subject to a batch update, each record in the plurality of records having respective meta data information, and the batch update being formed of a set of changes for the plurality of records, wherein the batch update applies the set of changes similarly to each record in the plurality of records;
        computer readable code configured to project application of the changes of the batch update in a first record in the plurality of records, the projecting including noting factors from the metadata information of the first record and determining affects of the changes as applied to the first record;
        computer readable code configured to (a) use the noted factors and determined affects from the first record to impact changes to each remaining record in the plurality of records, and (b) project application of the batch update changes to remaining records in the plurality of records in a manner employing user-defined heuristics such that each succeeding record is processed with respect to factors noted in processing of preceding records, wherein the user-defined heuristics are based on context, and help determine appropriate operation to perform on subsequent records, the determined operation being (i) applied consistently across the subsequent records, or (ii) determined for each subsequent record individually by user scriptable operations for specific parts of the record; and
        computer readable code configured to display a preview of the projected application of the batch update changes to the remaining records in the plurality of records with annotations including how the projected application of the batch update changes to the remaining records in the plurality of records were determined, wherein the preview allows for de-selection of the projected application of one or more of the batch update changes on a per record basis or an all records basis.

10. Computer program product as claimed in claim 9 wherein the computer readable code configured to display the preview further enables user interaction with records and projected application of the batch update changes as displayed in the preview;

the user interaction including any one or more of:
- adjustment of the projected application of one or more of the batch update changes;
- rewriting of one or more of the batch update changes in line of a certain record;
- committing one or more of the batch update changes; and reverting one or more of the batch update changes.

* * * * *